No. 671,306. Patented Apr. 2, 1901.
G. F. BLAKESLEE.
CLUTCH.
(Application filed Aug. 6, 1900.)
(No Model.)
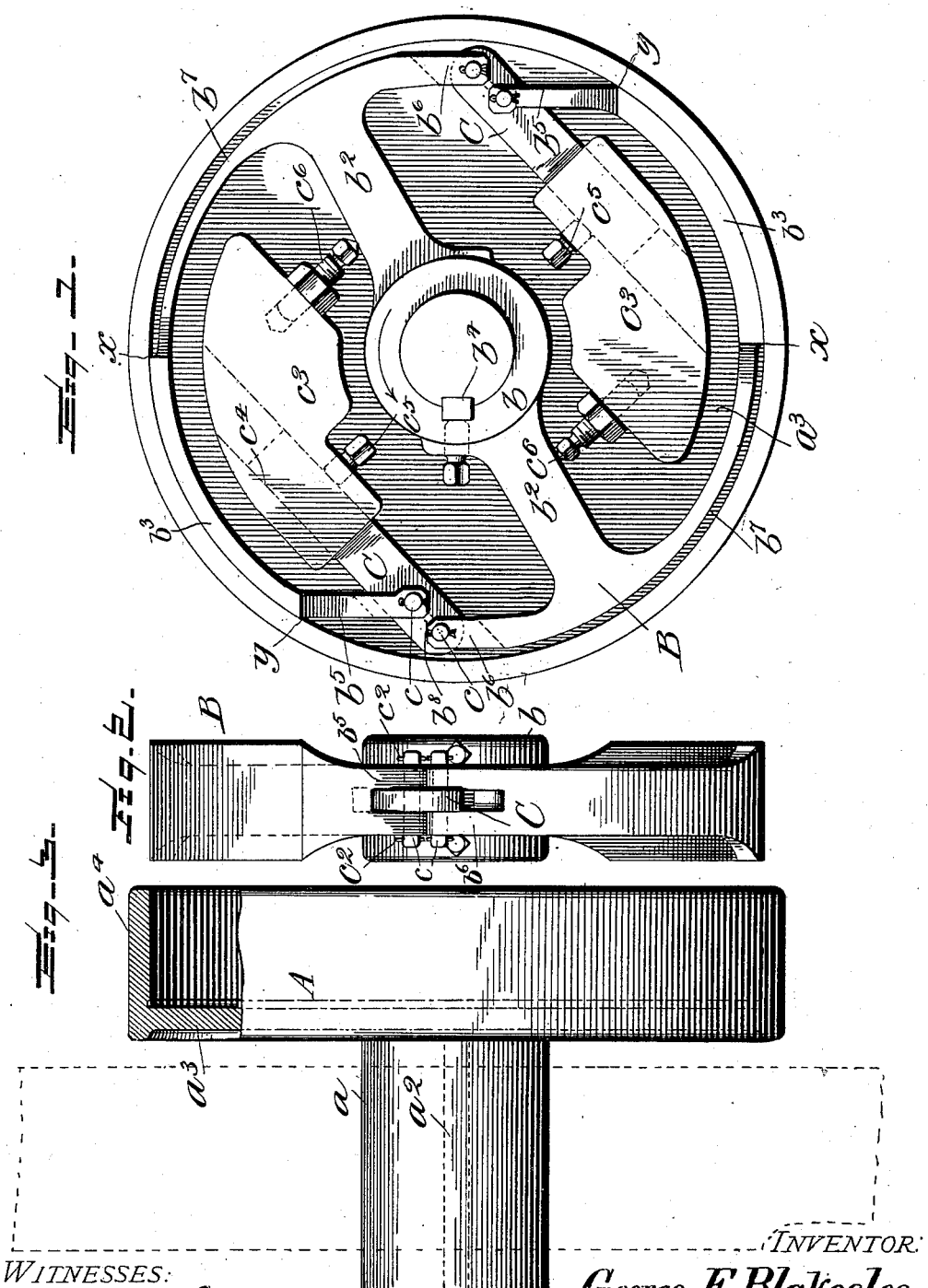
WITNESSES:
INVENTOR:
George F. Blakeslee,
by his attorney

UNITED STATES PATENT OFFICE.

GEORGE F. BLAKESLEE, OF BIRMINGHAM, ALABAMA.

CLUTCH.

SPECIFICATION forming part of Letters Patent No. 671,306, dated April 2, 1901.

Application filed August 6, 1900. Serial No. 26,088. (No model.)

*To all whom it may concern:*

Be it known that I, GEORGE F. BLAKESLEE, a citizen of the United States, residing at Birmingham, in the county of Jefferson and State of Alabama, have invented certain new and useful Improvements in Couplings or Clutches, of which the following is a specification.

The object is in a simple, efficient, and thoroughly practical manner to effect the automatic coupling or clutching together of moving parts of machinery and the automatic uncoupling or unclutching of such parts when moving very slowly or when they are at rest.

The invention consists in the novel construction and combination of parts of an automatic expansion or clutch, as will be hereinafter fully described and claimed.

In the coupling or clutch characterized by my invention I employ a pan or housing for the operative parts of the device, the pan constituting one of the clutch members, which pan when the device is to be used as a coupling between two shafts is keyed to one end of the driven shaft and when used as a friction-pulley is loose on said shaft. The pan consists of a circular plate carrying a rim or flange extending at right angles to the face of the plate, the rim to be either integral with or secured to the plate. Inclosed within the pan is what I term a "friction-center," comprising a hub having two arms carrying the shoes, which latter by engagement with the inner periphery or face of the rim serve to lock the parts of the clutch together, this center constituting the other clutch member and being keyed to the driving-shaft. The shoes, which in this instance are two in number, one carried by each arm of the center, are segments of a circle and are of a size practically to fill the inner diameter of the pan, the adjacent ends of the shoes being connected by levers carrying weights, which latter under the action of centrifugal force cause the shoes to expand, and thus engage the inner face of the rim, thereby to lock the two members of the clutch together.

Further and more specific details of construction will be described farther on.

In the accompanying drawings, forming a part of this specification, and in which like letters of reference indicate corresponding parts, I have illustrated a form of embodiment of my invention, it being understood that other forms of embodiment may be employed without departing from the spirit of the same.

In the drawings, Figure 1 is a view in front elevation, exhibiting the coupling or clutch with its parts assembled. Fig. 2 is a view in side elevation of the friction-center. Fig. 3 is a view in side elevation, partly in section, of the pan or housing.

Referring to the drawings, A designates the pan or housing, the same being provided with a hub $a$, to which can be secured a pulley, as indicated by dotted lines. The hub and the pan are by preference cast integral, and the hub is provided with a keyway $a^2$, by which to secure the pulley, when one is used, in place. The pan A comprises a circular back plate $a^3$ and a rim $a^4$, the plate and rim to be integral, or the rim to be secured to the plate, as may be preferred; but from a standpoint of simplicity in construction and cheapness of manufacture it is preferred that the parts be integral.

Mounted within the pan is the friction-center B, comprising a hub $b$, carrying in this instance two arms $b^2$ and shoes $b^3$. The center is a skeleton structure, as shown in Fig. 1, and all of its parts are formed integral by preference, although, if preferred, they may be made in sections and suitably assembled. The hub is provided with a keyway $b^4$, by which the center is secured to the driving-shaft. Each shoe is a segment of a circle and has one of its ends $b^5$ inset beyond the line of the inner wall of the other end $b^6$, the function of this arrangement being described farther on. Only a portion of the periphery of each shoe contacts with the inner face of the rim—say, a section included between the points $x$ and $y$, the other portion of the periphery being cut away, so as at all times to be free from the inner face of the rim, as shown at $b^7$. By this arrangement a more effective clutching action between the rim and the shoes can be effected than if the entire periphery of both of the shoes was brought into contact with the rim, and, further, by this arrangement the unclutching can be more readily effected. The ends $b^5$ $b^6$ of the shoes are bifurcated, as indicated by dotted lines in Fig. 1 and shown in full lines in Fig. 2, and working between the bifurcated portions are levers C, the same being held in operative position between the ends of the shoes by pins $c$ passing through both members of the bifurcated portions and being held from separation therefrom by split pins $c^2$. By having the ends $b^5$ of the shoes inset the levers C can be set at the proper angle with relation to the axis of the device, as will be readily understood by reference to Fig. 1. Each lever carries at its free end a weight $c^3$, the weight being provided with a channel $c^4$ in which the lever fits, a set-screw $c^5$ serving to hold the weight in position on the lever.

When the friction-center is cast, the ends $b^5$ $b^6$ are connected by a thin web of metal $b^8$, (indicated by dotted lines in Fig. 1,) and after the said ends of the shoes have been drilled for the reception of the pins $c$ and the levers C and weights $c^3$ have been fitted to position this web at each side is broken away, thus separating the shoes. Each weight carries a set-screw $c^6$, which is adapted to bear against the respective arms $b^2$, and by moving these set-screws the shoes may be properly adjusted with relation to the rim.

In fitting the center to the rim after the web has been broken the set-screws $c^6$ are turned to expand the shoes to a greater diameter than that of the house portion of the pan, the center is then turned down until the shoes are of the same diameter as the house portion of the pan, and the set-screws are then loosened to allow the shoes to retract. It will thus be apparent by thus fitting the center to the pan that when the shoes expand the contact between them and the rim will be absolutely true, as they are not thrown out of a true center by expansion.

In operation, the center being revolved in the direction of the arrow shown in Fig. 1, the weights $c^3$ will from centrifugal force be thrown outward, and in this movement will through the agency of the levers C expand the shoes and cause them firmly to grip the inner periphery of the rim, and in reverse manner as the center ceases to revolve centrifugal force will be overcome by the natural tension or set of the shoes and they will assume their normal position, thereby releasing them from contact with the inner periphery of the rim.

It is to be understood that I do not limit myself to the employment of two shoes and of two weights, as it is obvious that a greater number of each may be employed without departing from the spirit of my invention.

In use this device is particularly adapted for employment in connection with gas or gasolene engines, and when used as a friction-pulley will be automatically disengaged from the load to effect ease in starting the engine and automatically attached to the load when the engine is in operation. When used as a coupling, the same results are attained when operating in connection, say, with a pump or with any other machine which requires direct connection.

Having thus fully described my invention, what I claim as new, and desire to secure by Letters Patent of the United States, is—

1. A device of the character specified, comprising a pan, a friction-center housed therein, shoes carried by the center, levers connected with the shoes, and weights adjustably connected with the levers, substantially as described.

2. A device of the character specified, comprising a pan, a friction-center housed therein, shoes carried by the center, a portion of the shoes being cut away, levers connected with the shoes, and weights adjustably connected with the levers, substantially as described.

3. A device of the character specified, comprising a pan, a friction-center housed therein, shoes carried by the center, a portion of the periphery of the shoes being cut away, levers connected with the shoes, weights carried by the levers, and a set-screw carried by each weight to hold it at the desired position on the lever, substantially as described.

4. A device of the character specified, comprising a pan, a friction-center housed therein, shoes carried by the center, the adjacent ends of the shoes being bifurcated, levers pivoted between the bifurcated portions, weights carried by the levers, a set-screw carried by each weight to hold it at the desired point on the lever, and a set-screw also carried by each weight to effect proper adjustment of the shoes with relation to the rim of the pan, substantially as described.

In testimony whereof I affix my signature in the presence of two subscribing witnesses.

GEORGE F. BLAKESLEE.

Witnesses:
S. E. THOMPSON,
C. B. WHITE.